United States Patent [19]

Vandierendonck

[11] 3,855,577

[45] Dec. 17, 1974

[54] POWER SAVING CIRCUIT FOR CALCULATOR SYSTEM

[75] Inventor: Jerry L. Vandierendonck, Santa Cruz, Calif.

[73] Assignee: Texas Instruments Incorporated, Dallas, Tex.

[22] Filed: June 11, 1973

[21] Appl. No.: 368,779

[52] U.S. Cl. .............................................. 340/172.5
[51] Int. Cl. .............................................. G06f 1/00
[58] Field of Search....... 340/172.5, 173 R; 307/238

[56] References Cited

UNITED STATES PATENTS

| | | | |
|---|---|---|---|
| 3,688,280 | 8/1972 | Ayling et al. | 340/173 R X |
| 3,736,569 | 5/1973 | Bouricius | 340/172.5 |
| 3,736,574 | 5/1973 | Gersbach | 340/173 R |
| 3,740,730 | 6/1973 | Ho et al. | 340/173 R |
| 3,764,833 | 10/1973 | Ayling et al. | 307/238 X |

*Primary Examiner*—Harvey E. Springborn
*Attorney, Agent, or Firm*—James O. Dixon

[57] ABSTRACT

Disclosed is a calculator system of the type implemented on semiconductor chips and featuring selectively de-energible decoders comprised preferably of programmable logic arrays of decoder circuits which are utilized only for a non-periodic and/or periodic fraction of the total operating time and de-energized for power savings except when needed to decode, for example, instruction words.

7 Claims, 20 Drawing Figures

POWER SAVING CIRCUIT FOR CALCULATOR SYSTEM

This invention relates to expandable calculator systems in general allowing additional data storage registers to be implemented into the system, and more specifically to calculator systems implemented on semiconductor chips utilizing a plurality of other register semiconductor chips for increasing data storage capacity.

Subject matter related to the electronic calculator chip herein disclosed is found in the following copending cases filed concurrently herewith and assigned to the assignee of this invention: "Expandable Data Storage For a Calculator System," Ser. No. 368,901; "Expandable Data Storage For A Calculator System," Ser. No. 368,906; and "Calculator Data Storage System," Ser. No. 368,780.

Electronic desk-top calculators have been changed in design due to the availability of MOS/LSI chips allowing the entire system to be embodied in only one or a small number of semiconductor devices. This technology permits large savings in manufacturing, labor and material costs and allows calculators to have operating functions not possible at reasonable cost in machines built from discrete devices, or from numbers of integrated circuits. Calculator systems have heretofore been implemented using only one MOS/LSI chip, as set forth in detail in copending patent application Ser. No. 163,565 now abandoned and continued in Ser. No. 420,999, filed Dec. 3, 1973, assigned to the assignee of this invention, which utilizes the sequential addressing of a particular random access memory array to provide a plurality of shift registers. This sequentially addressed memory implements the main data registers in a space on the chip much less than needed for shift registers of conventional design.

More complex calculators require a plurality of semiconductor chips, one of which is disclosed in Ser. No. 255,856, "Electronic Calculator", now abandoned and continued in Ser. No. 360,984, filed May 16, 1973 assigned to the assignee of this invention. In that calculator system, a "data" chip and a ROM chip provide the basic calculator system, which was further described in a continuation filed thereon, "Expandable Function Electronic Calculator," Ser. No. 360,984, filed May 16, 1973. In that system, the basic two-chip calculator system employs various flag and external input/output controls in combination with specific timing and addressing means so that additional external functions are provided to allow an expandable system.

It is therefore an object of this application to provide the external register chips adapted for communication with the two-chip system above described featuring a plurality of separate registers with the option of each chip and registers separately addressable, or all chips and registers simultaneously addressable. Only a minimum number of interconnecting terminals may be utilized and a minimum system delay in overall operation with the basic two-chip system is essential.

Briefly, and in accordance with the present invention, at least one 10-register chip is provided in combination with a basic two-chip calculator system for increasing the data storage register capacity of the two-chip system. Up to 16 register chips are provided with each chip providing up to 10 individually addressable registers. Each chip is characterized as including flag input means for determining when the 10-register chips of this invention are being addressed by the basic two-chip system, input means for selectively storing a multibit, multidigit address word representing not only the function to be performed, but which chip is being addressed and which register therein is being addressed. Further, chip select means is provided for decoding a particular digit of the address word for determining which ten register chip is being addressed. Means are provided for decoding another digit of the address word, including periodically actuated means and non-periodically actuated means for determining which register in the particular chip is being addressed. Means are provided for decoding another digit of the address word for determining whether the function commanded is an input or an output function. Further means are provided for decoding the address word and implementing a clear all register chips, a clear one register chip, or a clear one register in one particular register chip instruction. The registers are implemented using a sequentially addressed memory driven by a state time counter which also provides for internal timing signals.

The novel features believed characteristic of the invention are set forth in the appended claims.

The invention itself, however, as well as other objects and advantages thereof, may best be understood by reference to the following detailed description when read in conjunction with the accompanying drawings, wherein.

Figure 1:
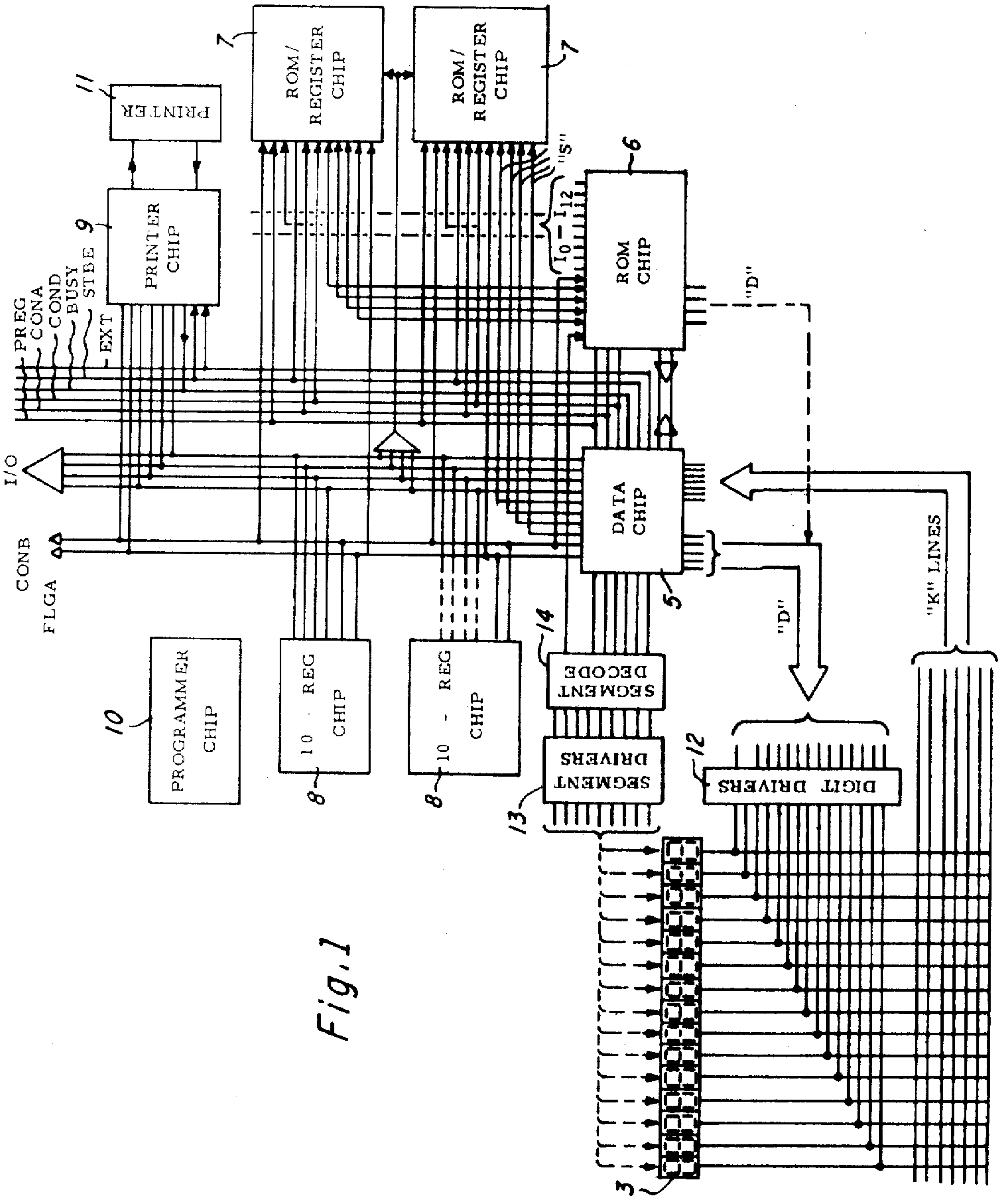
FIG. 1 is a simplified block diagram of the expandable calculator system featuring the external 10-register chips of this invention.

Referring now to FIG. 1, there is shown a functional block diagram of the expanded calculator system described in the above mentioned copending patent application Ser. No. 163,565 which is incorporated herein by reference, showing the data chip and ROM chip, interconnected with the peripheral register chips of this invention providing expanded calculator register capacity. The data chip 5 generates a plurality of control signals to the ROM chip 6, to an external set of ROM register chips 7, providing for both increased data word storage and increased instruction word storage capacity, to the external 10-register chip set 8, providing external data word storage capacity, to the external programmer chip 10, providing a means for programming specific subroutines into the calculator externally, and to external printer chips 9 for controlling output printers 11. The output printers 11 may be a conventional design with adaptions to the printer chip 9, but preferably are of the thermal printer type or the drum printer type.

The control signals generated by the data chip 5 include the control signals:

Condition A (CONA) or inhibit increment for indicating that an interrupt is desired in the normal sequencing of the ROM to allow additional executions by the system before the next instruction word is to be executed;

Condition B (CONB) is indicative of the idle condition of the data chip, i.e., whether the data chip is actually in the calculating mode (non-idle) or in the display mode (idle);

Condition (COND) indicates that a condition flag has been set indicating a comparison of the particular flags or desired digits of an instruction word;

Flag A (FLGA) is the serial output of the flag register in the SAM at an output rate determined by COND;

State Times (S-times) indicate the state timing (timing controlling data manipulation) of the data chip, 16 of which state times generate a D-time;

Display Times (D-times) indicate which set state times of the program the calculator is currently executing, wherein 16 S-times constitute an instruction cycle, and the D-times are generated in cycles of 15 so that D-times precess from the particular D-time of the preceding cycle;

Keyboard Inputs (K-lines) are signals from the keyboard for entering externally commands to the data chip;

P Register (PREG) indicates that the data chip is addressing ROM storage and indicates which ROM storage area is being addressed;

Instruction Words ($I_0$–$I_{12}$) indicate the particular instruction word stored in a particular ROM instruction storage unit;

External (EXT) indicates that the external terminal on the data chip is either sending or receiving data;

Strobe (STBE) is a programmable signal determining the period of D-times, herein preferably chosen as 15;

Busy (BUSY) represents the condition of the printer as determined by the printer chip 9 that the printer is/is not busy and cannot/can receive another command for printing.

Referring again to FIG. 1, the data chip 5 provides output information from Register A and Flag Register A to the segment decoder 14. Such information is communicated as: position of the comma, position of the decimal point, actual data to be displayed from the A-register, and data to be displayed from the Flag A-Register. The segment decoder 14 is a conventional decode circuit for decoding the binary coded decimal output information for actuating the segment drivers 13. The segment drivers 13 comprise conventional driver circuits for actuating the above-mentioned displays 3, here shown to have a seven segment display per digit.

The data chip also provides D-times to the digit drivers 12 for selectively scanning the digits of the display 3. Scanning of the display matrix is explained in detail in the above-mentioned application Ser. No. 163,565. The preferred embodiment herein disclosed provides a first set of D-times from the data chip and a second set of D-times from the ROM chip, which combination of sets comprise a 15 D-time cycle.

The data chip is responsive to the K-information which is generated from the D-time strobing of the keyboard input. This scanning of the keyboard is set forth subsequently in detail.

The ROM chip 6 is responsive to COND, CONA, PREG, STBE, and the S-times signals from the data chip 5 and generates in response thereto the instruction word $I_0$–$I_{12}$, the D-times, and IRGA and IRGB to the data chip.

The 10-register chip 8 is another set of peripheral chips providing expanded data storage capacity to the calculator system of this invention. The 10-register chip is responsive to Flag A, CONB, and I/O information from the data chip for providing recall data through the I/O lines in return to the data chip.

The printer chip 9 is responsive to the I/O information from the data chip, the external, CONB, Flag A, and STBE commands from the data chip for printing in accordance with data on the I/O lines.

Figure 2:
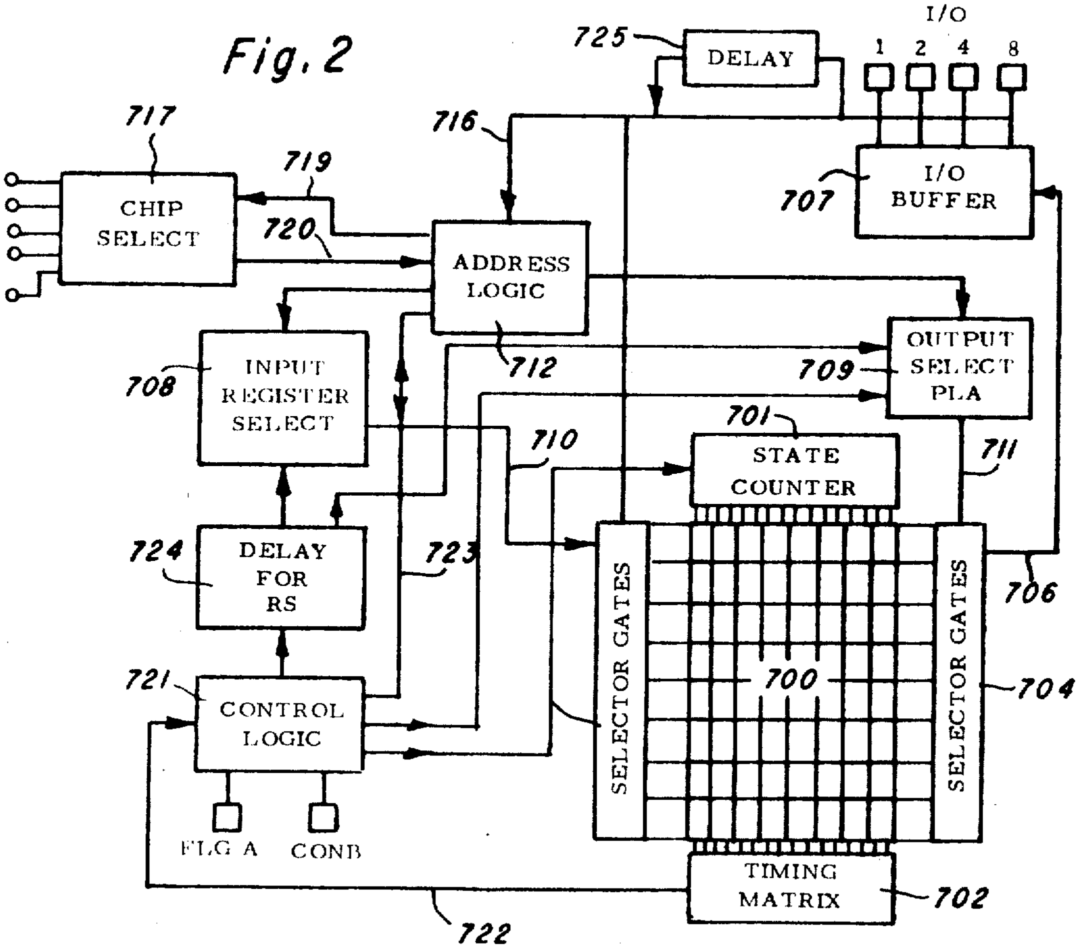
FIG. 2 is a simplified block diagram of one embodiment of a 10-register chip of this invention.

Referring to FIG. 2, the external data register system of the invention is shown in block diagram form. Generally, the system is an MOS/LSI chip designed for use with other chips, e.g., the data chip and ROM chip system as discussed in the system of FIG. 1, to provide a calculator system. The chip of this invention contains 10 registers implemented in a SAM 700. A SAM is a sequentially addressed memory as described in copending application Ser. No. 163,682, Random Access Memory Shift Register System, by Antony G. Bell, filed July 19, 1971, and assigned to the assignee of this application; the particular type of SAM used in a preferred embodiment of this invention is described in copending application Ser No. 334,493, by Richard Chang, "Memory Cell For Sequentially Addressed Memory Array," filed Feb. 21, 1973 and assigned to the assignee of this application. The memory 700 contains 10 registers of 16 digits each, arranged in BCD so each register is actually four parallel registers. Thus, $10 \times 16 \times 4$ or 640 bits are contained in the memory 700. A state counter 701 generates state times $S_0$ to $S_{15}$ which correspond to the state times in the data chip. This state counter is a ring counter of contemporary type. A timing matrix 702 is connected to the SAM 700 to be actuated by the same timing signals which sequentially address the memory; the matrix 702 generates a number of timing signals for use in the chip at various points. Data in the memory 700 may be operated on in several ways, under control of selector gates 703 and 704 on the left and right sides of the SAM. For example, data may be input, output, recirculated, right shifted, and cleared in the SAM 700. The data input, recirculate and clear functions are implemented by selector gates 703 on the left side, and data output and right shift are implemented by selector gates 704 on the right side. Data input is from input/output pins I/O1 to I/O8 which are connected to the data chip, via connection 705; data output is to the same I/O pins via connection 706 and I/O buffers 707. Selection of a particular register among the 10 in memory 700 to input data into or to be written into (or cleared) is accomplished by a periodically actuated input register select decoder 708 and selection of a particular register to be read out of is accomplished by a non-periodically actuated output select decoder 709. The outputs 710 and 711 of the decoders 708 and 709 function to open and close specific gates within the groups of select gates 703 and 704 to perform the desired function. The input and output selection decoders 708 and 709 receive outputs from an address logic arrangement 712 and they are selectively actuated for only a portion of the time inputs are received from arrangement 712, thereby effecting power savings which is an important feature of the invention.

ADDRESSING THE 10-REGISTER CHIP

Figure 3:
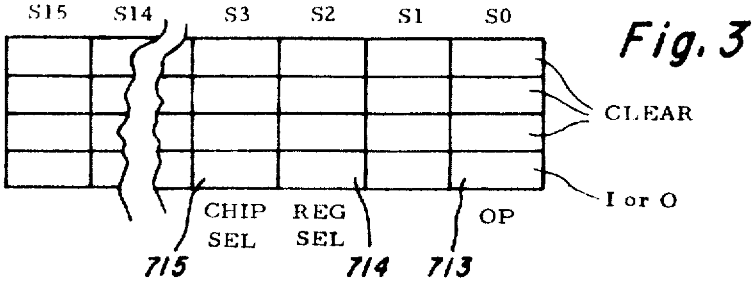
FIG. 3 depicts the four bit/16-digit instruction word utilized for addressing the 10-register chips of this invention; and FIGS. **4*a*–4*p*** is a sectional detailed schematic of a preferred embodiment of the 10-register chip.

The 10-register chip is addressed by a selectively chosen portion of a data word appearing on the I/O pins, which portion is determined in accordance with a particular gate program masking step during manufacture. Referring to FIG. 3, a format for a data word is seen to include 16 four-bit digits; only the first four are used in this particular embodiment. The least significant digit, occurring during time $S_0$, is ordinarily used in the usual processing of data in the data chip to indicate the position of the decimal point; in the 10-register chip, $S_0$ is used to define the operation to be performed. Within the least significant digit 713 or $S_0$, the least significant bit indicates either an input or an output function; i.e., the $S_0$ "1" bit signifies input function by a "1" and an output function by a "0." The other three bits are used to signify either input of data or input of zeros which clears the registers. Clear is a special case of input because zeros are inputed; several possibilities of clear operations exist, these being (1) clear a specific register in a specific chip, (2) clear all registers in a specific 10-register chip, or (3) clear all 10-register chips. The "2" and "4" bits in $S_0$ time 713 define which of these clear functions shall occur; the specific bits and their code are gate programmable in the address logic 712. The digit of $S_1$ time in FIG. 3 is not used, while the next two digits 714 and 715 are used for register select and chip select, respectively. One of the 10 registers is defined by a four bit code sent during $S_2$ time 714; this appears on the I/O pins in parallel, and is stored in the proper place in address logic 712 via input 716 of FIG. 2, and decoded in register select decoders 708 and 709. For example, if an output operation from register seven was desired, the first digit 713 would be 0000 and the $S_2$ digit 714 would be binary seven or 0111. The third item in the address word of FIG. 3 is chip select digit 715 occurring at $S_3$. One of the 16 possible 10-register chips may be selected by the four bit binary code occurring at $S_3$. The $S_3$ digit 715 is received by the address logic 712, stored, and applied to chip select logic 717. Four pins 718 are available external to the package, and are connected when the package containing the ten register chip is affixed to a printed circuit board upon manufacture, to be connected to either "1" $V_{SS}$ or "0" $V_{DD}$ to define a four bit code. When the four bit chip select digit 715 applied to chip select logic 717 via connection 719 from address logic 712 matches the code wired into the pins 718, then a select signal is applied back to the address logic via connection 720 to render the chip able to execute the designated operation. Another input $\overline{CS}$ to the chip select logic 717 provides higher order chip selection, i.e., if more than 16, 10-register chips are needed, as will be described later.

In order to cause the 10-register chip to accept a data word as an address and perform the desired function, a flag is generated in the data chip and outputed via FLGA pin, from whence it is received at FLGA pin on the 10-register chip and applied to control logic 221. If this special enabling function were not provided, the 10-register chip would confuse data ordinarily appearing on I/O pins with an address word as in FIG. 3. A dedicated flag, used for no other purpose, is used in the program of the data chip to mean that the 10-register chips are to be addressed. This may be a flag in Flag A register at time $S_{14}$, for example. Also, since flags are used to send annotations to the display, e.g., minus sign, error, overflow, etc., the CONB designation, as described in the above referenced application "Expandable Electronic Calculator," filed May 16, 1973, is used to distinguish between the data chip being in the idle or not idle operating condition. CONB is also applied to control logic 721 as seen in FIG. 2. When CONB is zero, the data chip is in idle or display mode and the flags are in time with D's or D-times; at such time, the 10-register chip is never addressed, so flags are ignored at logic 721. When CONB is one, the data chip is in not idle, and flags are in time with S-times; at such time, a flag at 10-register chip time $S_{14}$ will cause the 10-register chip to accept an address. The control logic 721 also generates several control signals used throughout the chip as will be described, and for this purpose receives timing signals from the timing matrix 702 via connections 722, as well as signals to and from the address logic 712 via connections 723.

An input instruction sequence for operating the 10-register chip occupies four instruction cycles in the data chip (actually five in the 10-register chip). The first instruction is "Set Flag"; during this instruction cycle a logical "1" is set in Flag A-register at a particular S-time for example, $S_{14}$. This causes the control logic 721 to condition the ten register chip, particularly the address logic 712, to receive an address. The next instruction is "Reg to I/O"; during this instruction cycle a register in the data chip is read out on the I/O lines, this register being B or C, for example. Whichever register is used, contains the address as seen in FIG. 3. The address is read into the address logic 712 and stored. The third instruction is "zero flag" meaning that the Flag A-register $S_{14}$ position in the data chip is reset to zero by an appropriate instruction word; this is to prevent the $S_{14}$ flag from inadvertently activating the 10-register chip again. the fourth instruction is "A-Reg to I/O," whereupon the contents of the A-register in the data chip are presented to the I/O pins from which the 16 digits of information in the A-register may be written into the selected register in the 10-register chip. A delay of one state time in the ALU of the data chip in the path between the A-register and the I/O pins causes the information in the selected register of the memory 700 of the 10-register chip to be displaced one state time. For this reason, the data entered in the 10-register chip must be right-shifted by one state time so that when it is brought back into the data chip to be used in a subsequent operation it will be in the proper time position. So, immediately following the "A-Reg to I/O" instruction, during the next instruction cycle, the 10-register chip automatically right-shifts any data word just entered. This is done by generating a one-instruction-cycle delay in a delay circuit 724, and applying the delayed signal to the input register select logic 708. The right shift function is produced without an instruction word from the data chip; the program of the data chip can go on to other operations while the 10-Register chip is executing this automatic right shift function. The delay of one state time between the A-register in the data chip and the selected register in the 10-register chip results in another problem in addition to requiring right shift. That is, the 16the digit, at $S_{15}$, does not arrive until $S_0$ of the next cycle during which automatic right shift is occurring. So, to avoid overlap, the 16th digit is held in a sample-and-hold circuit 725 until $S_{15}$ of the next or automatic right shift cycle, then it is inserted in the $S_{15}$ slot. Thus, only 15 digits go through right shift, the 16th is held and then inserted at $S_{15}$ of the following instruction cycle.

An output operation using four instruction cycles is simpler in that right shift is not required on the 10-register chip. Again, the first instruction on the data chip is "Set Flag A at $S_{14}$." The second instruction word produces an address word serially on the I/O pins; the first digit of the address word is "0000" meaning output operation, the second digit is not used, and the third and fourth define register select and chip select. The third instruction word is "Zero Flag A at $S_{14}$." The fourth instruction word is "I/O to A Reg," during which the selected register in the memory 700 is outputed through connection 706 and I/O buffers 707 to the I/O pins and thence to the A register in the data chip via the ALU. The delay in the ALU must be again accounted for, so the first digit is communicated from the 10-register chip one state time early; output occurs starting at $S_{15}$ of the third cycle and ending at $S_{14}$ of the fourth cycle.

Figures 4, 4A, 4B, 4C, 4D, 4E, 4F, 4G, 4H, 4I, 4J, 4K, 4L, 4M, 4N, 4O, 4P:
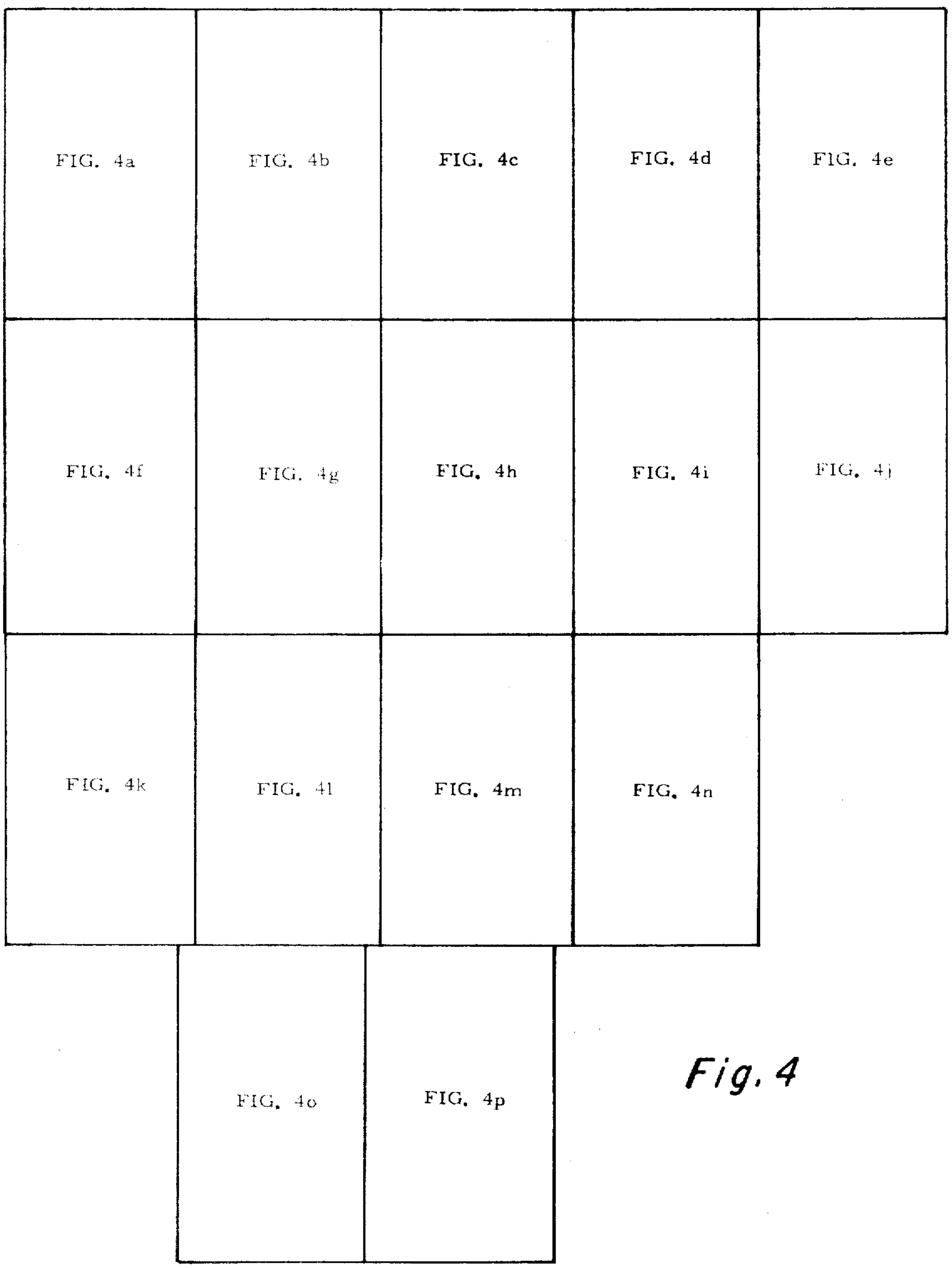
Figure 4A:
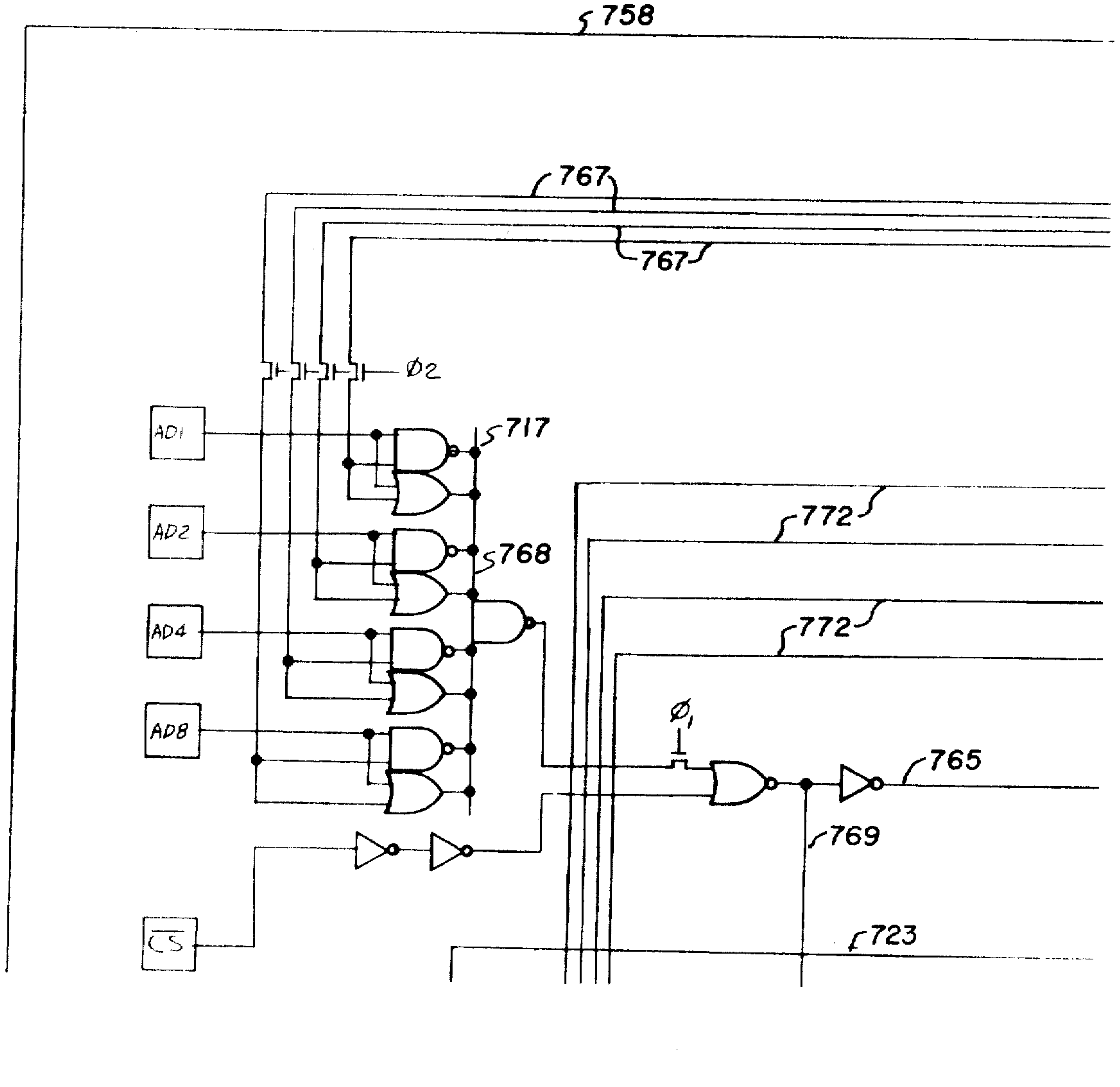
Figure 4B:
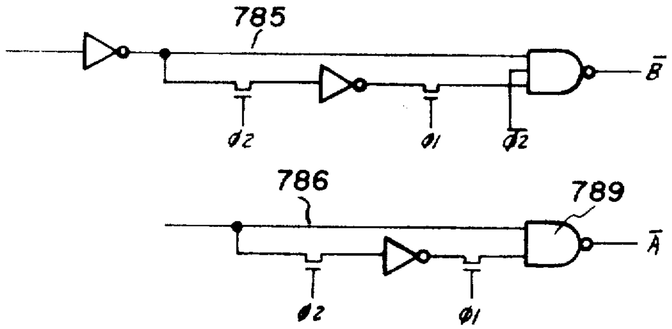
Figure 4B:
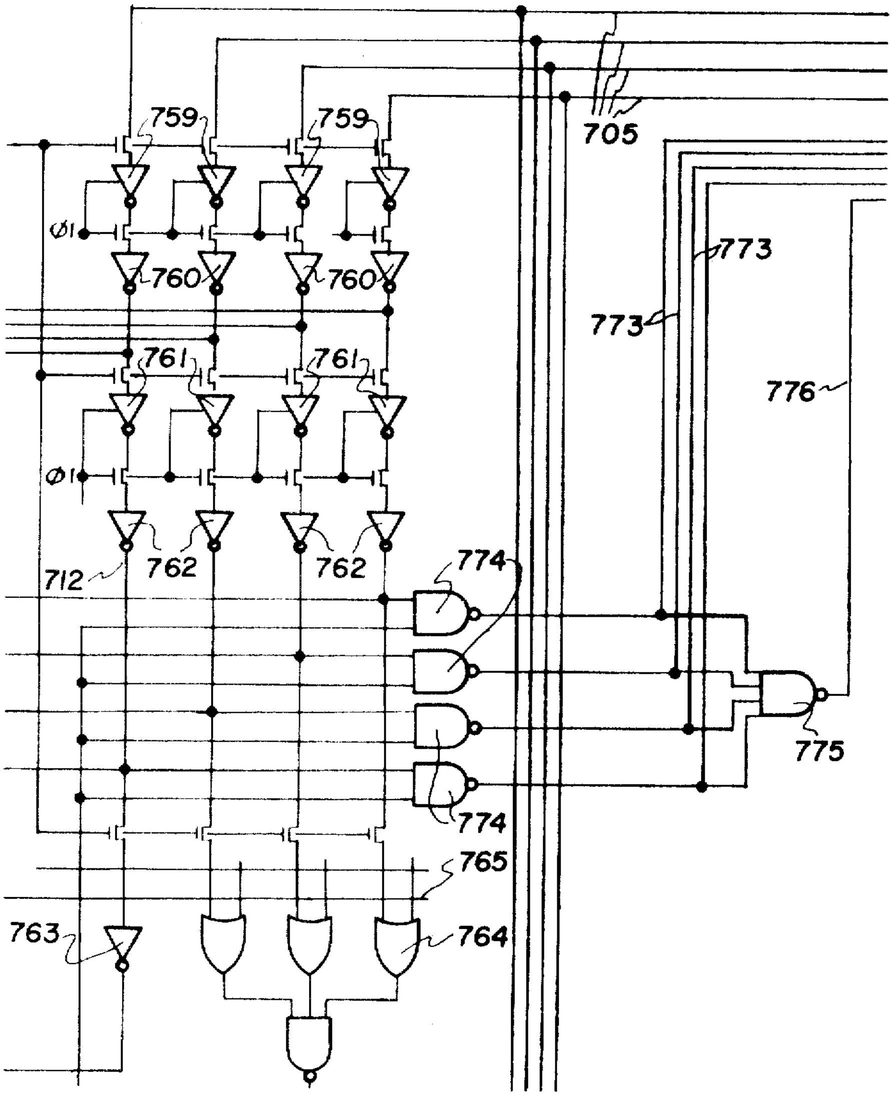
Figure 4C:
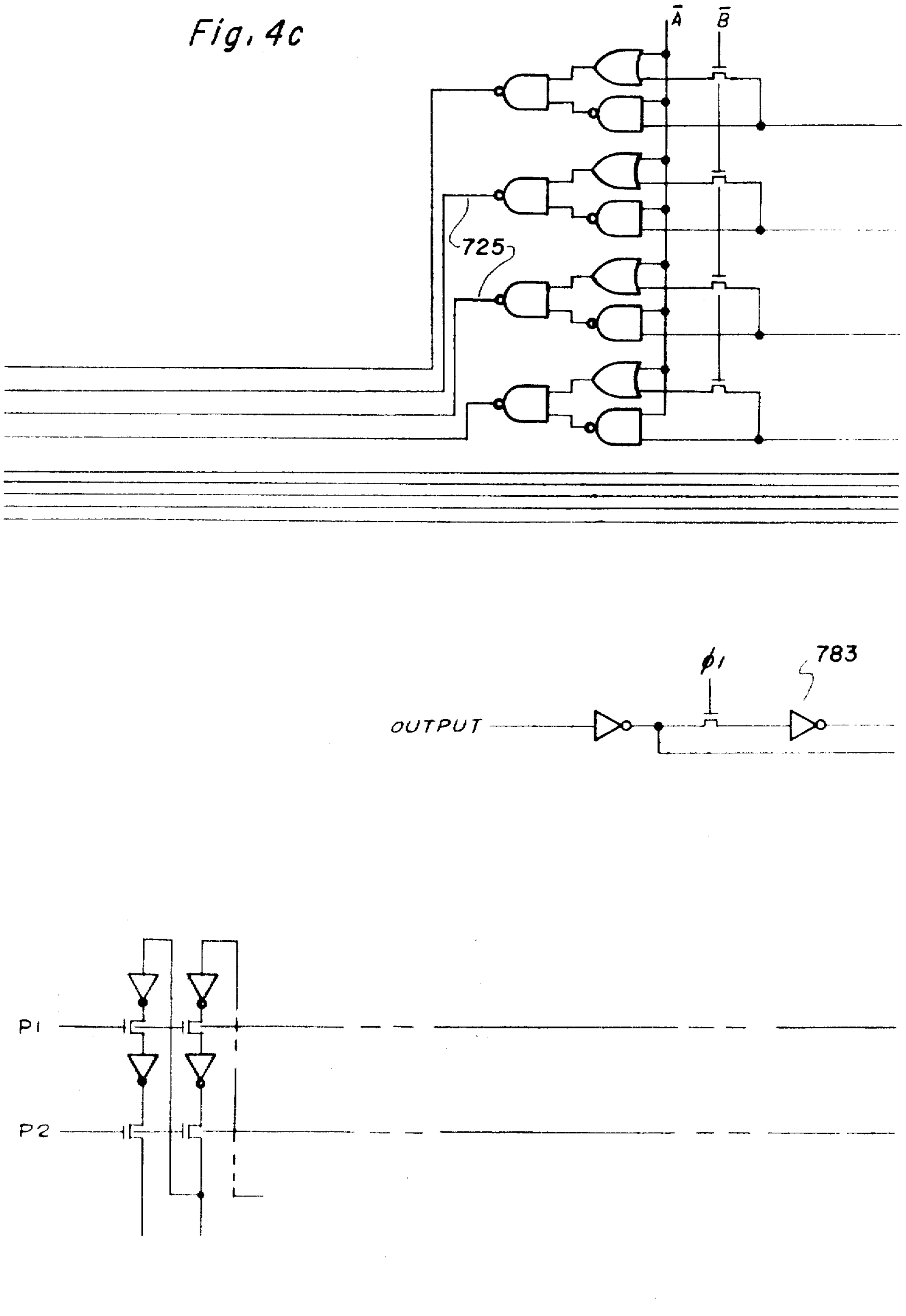
Figure 4D:
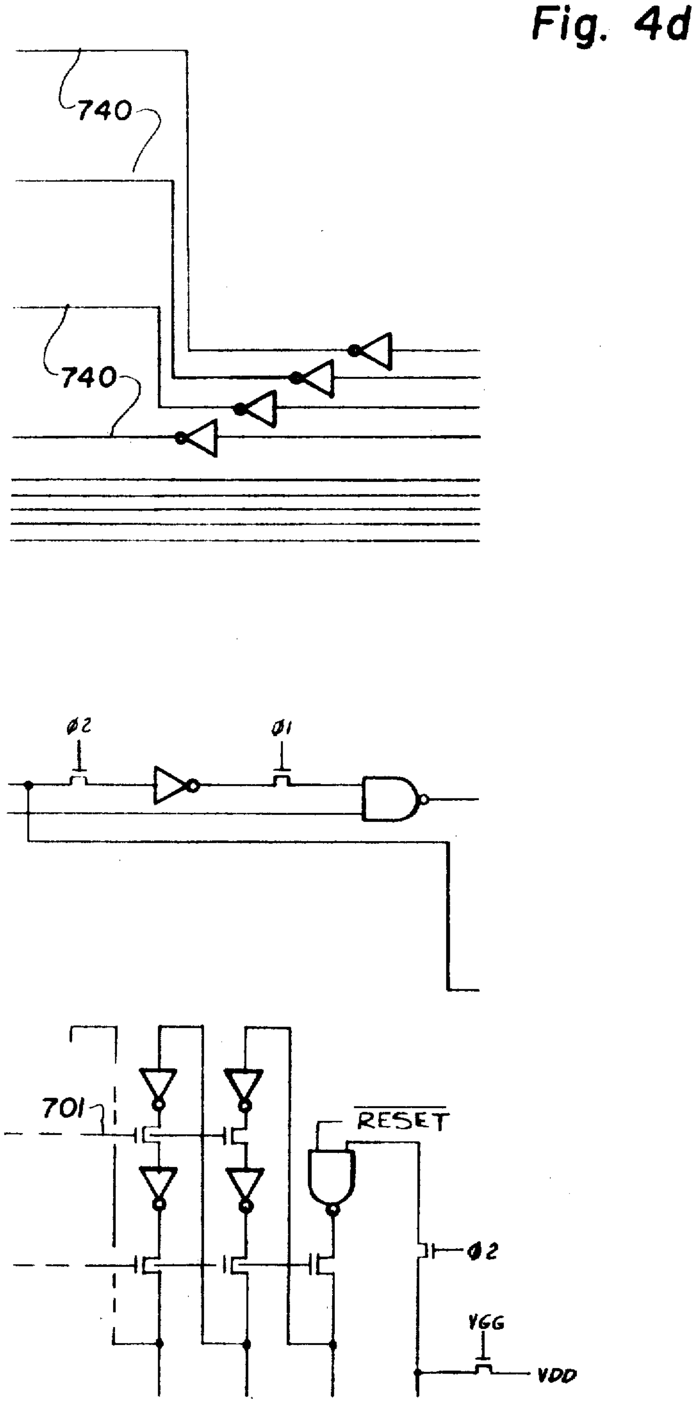
Figure 4E:
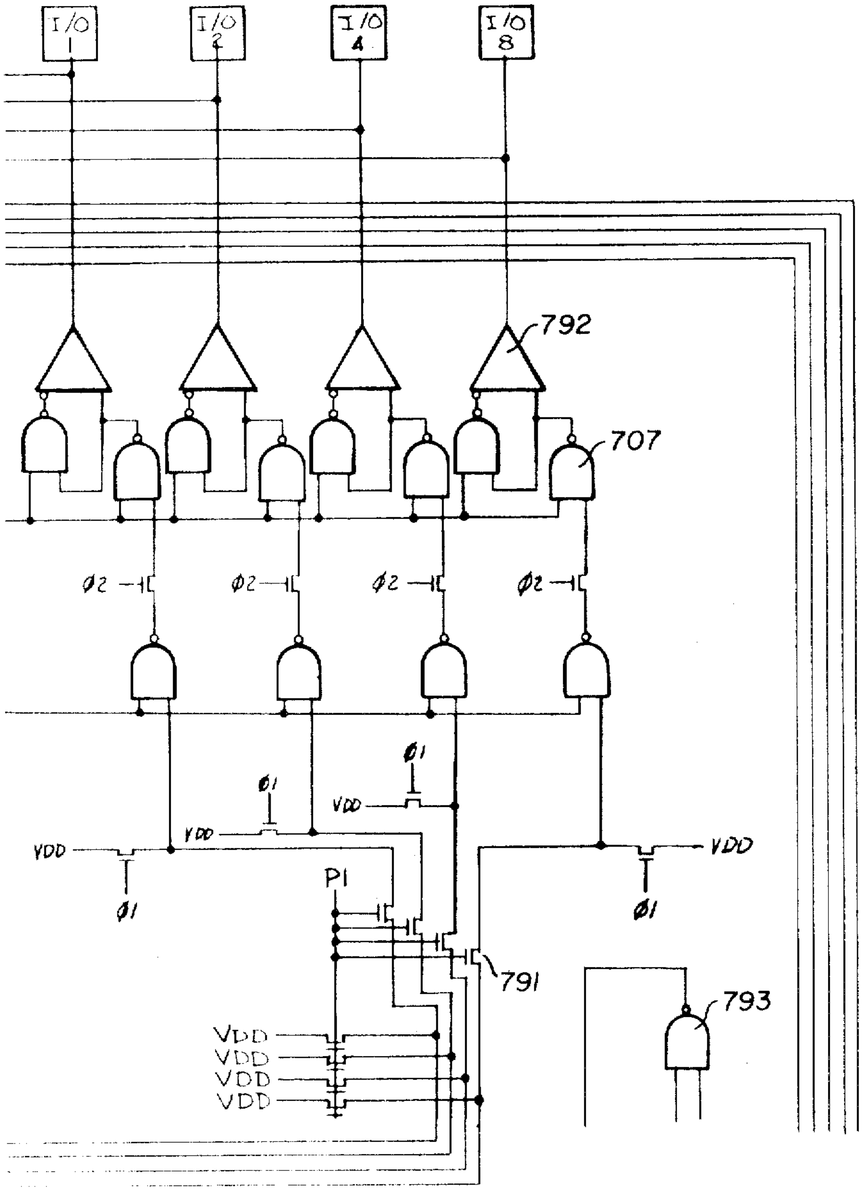
Figure 4F:
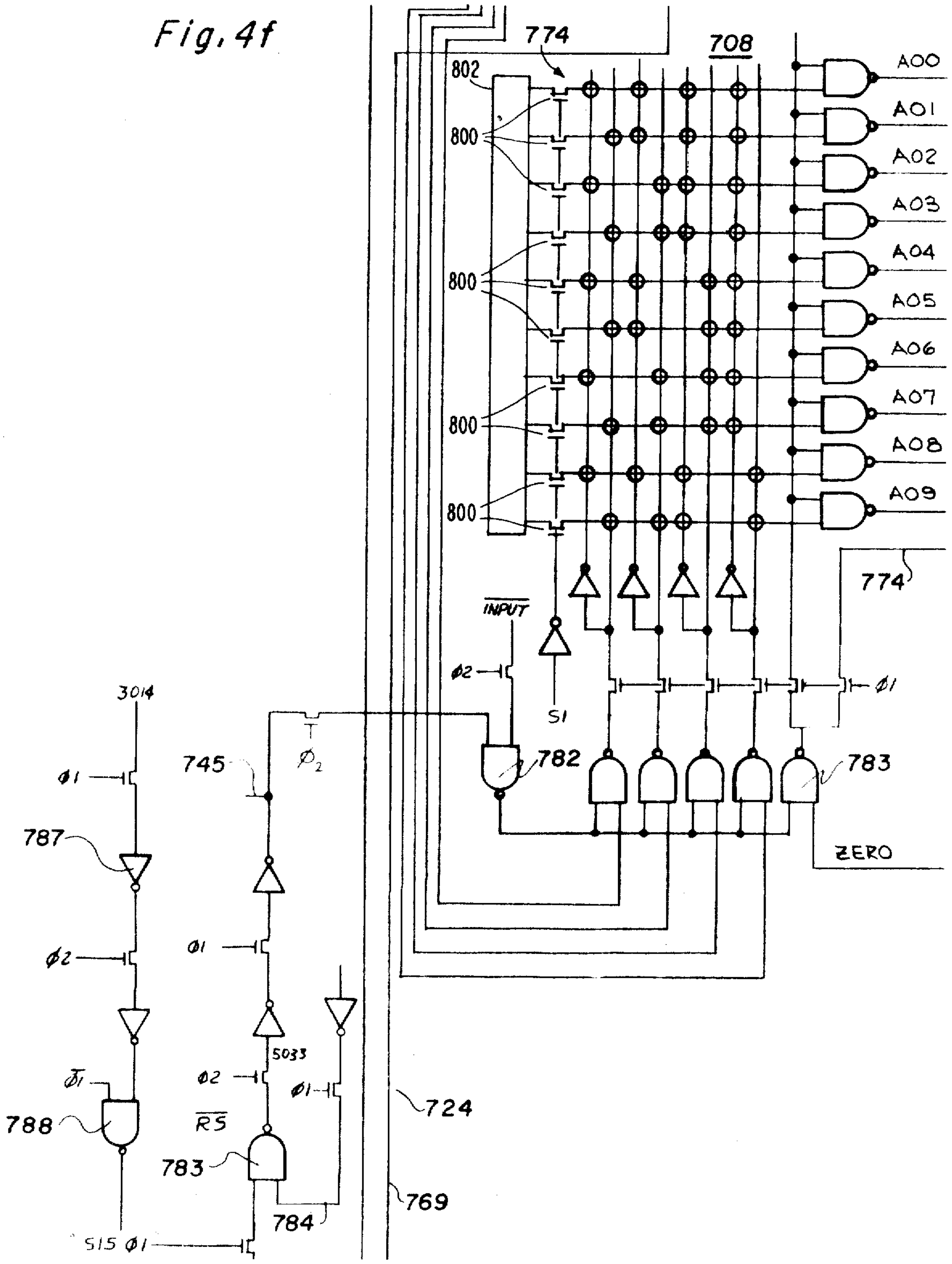
Figure 4G:
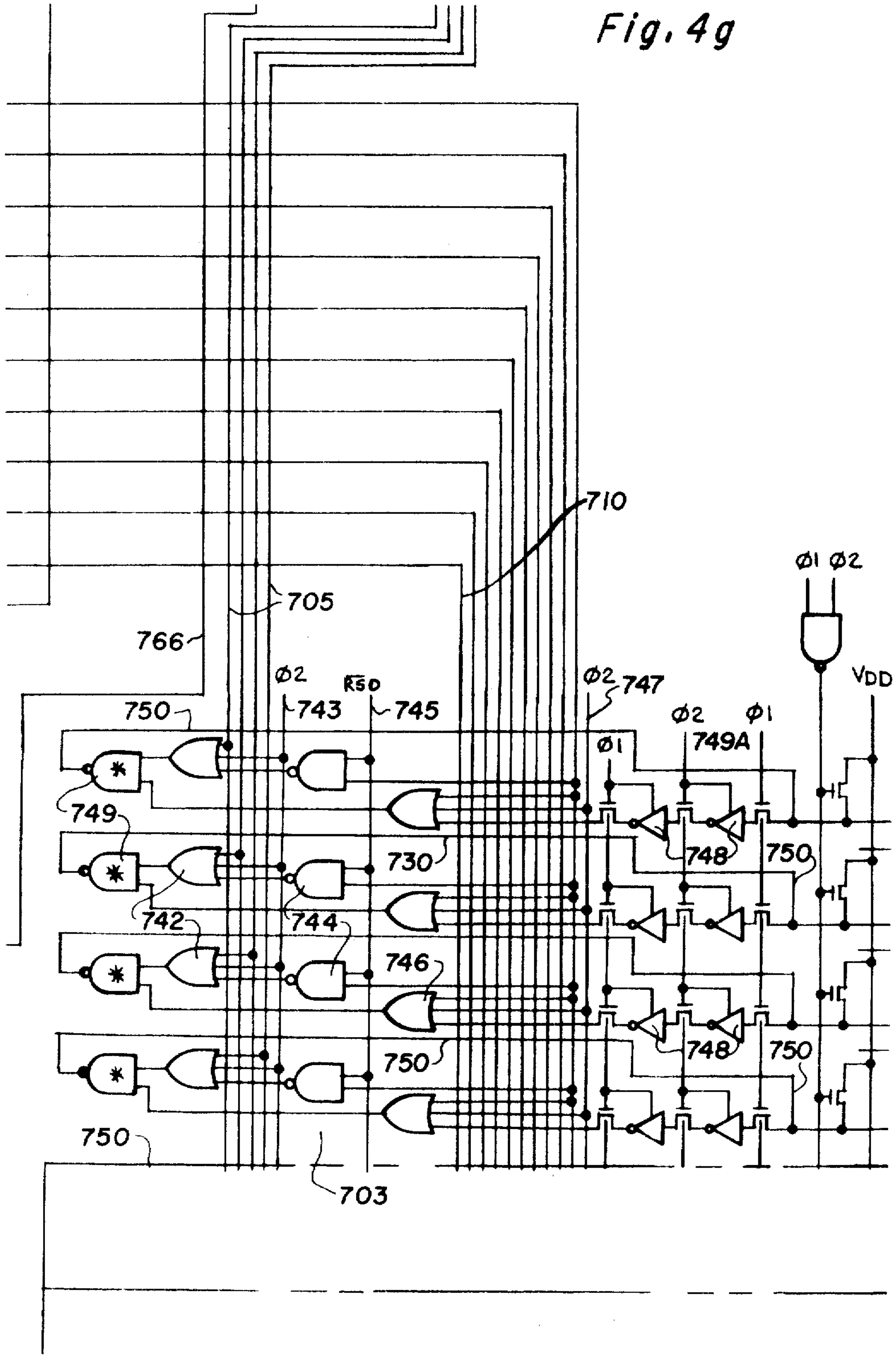
Figure 4H:
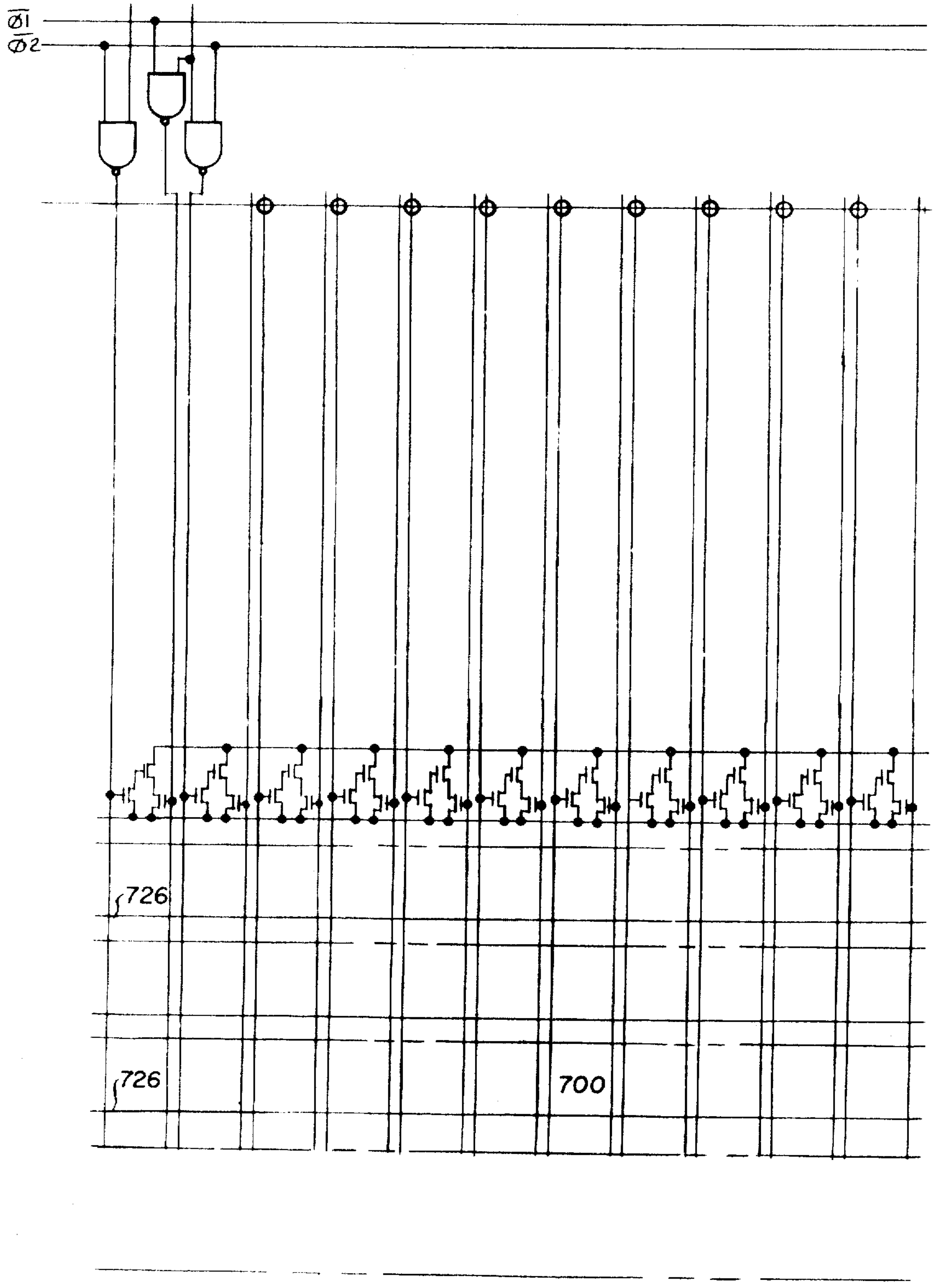
Figure 4I:
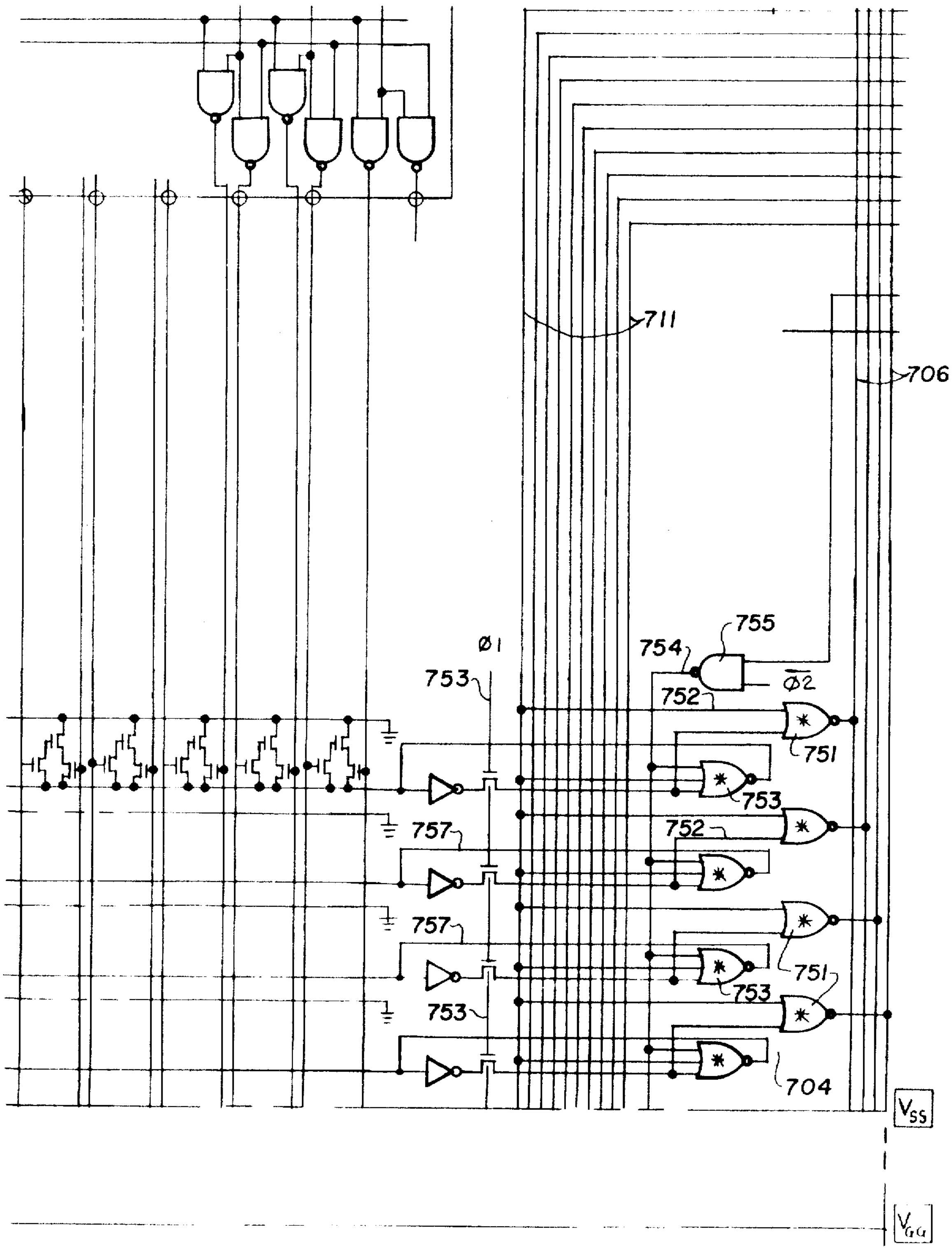
Figure 4J:
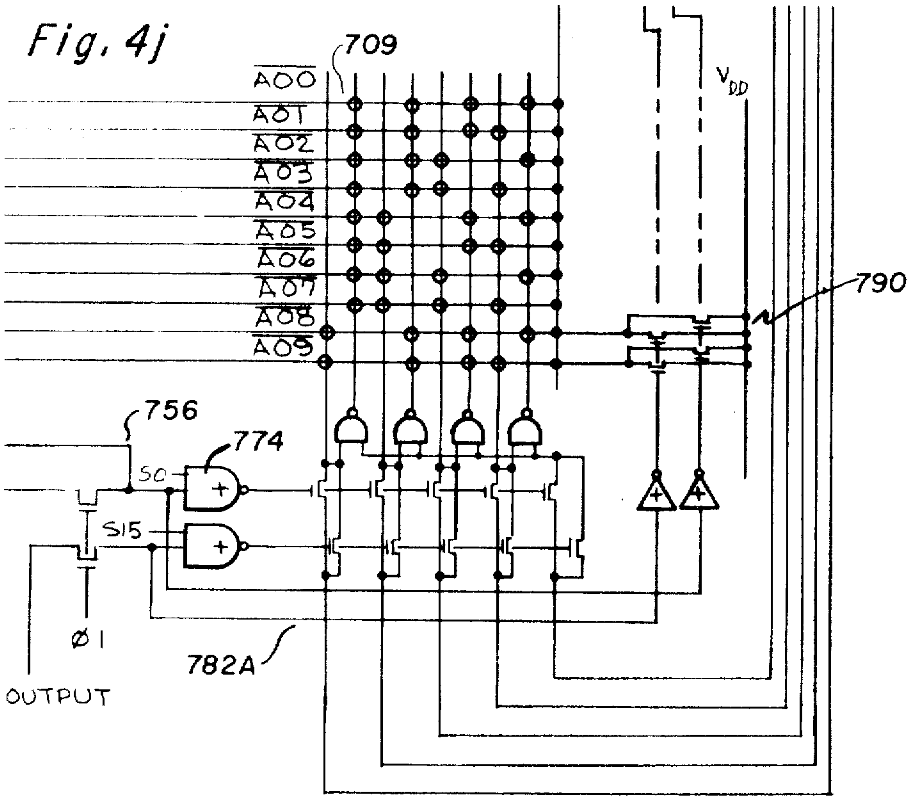
Figure 4K:
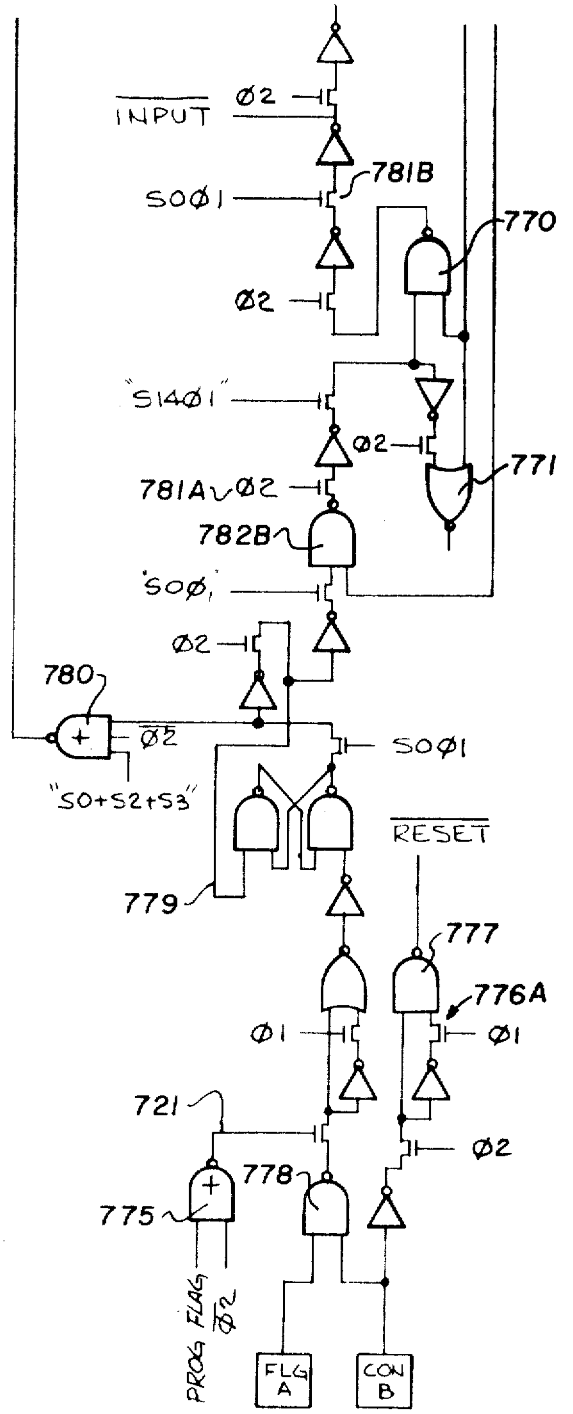
Figure 4L:
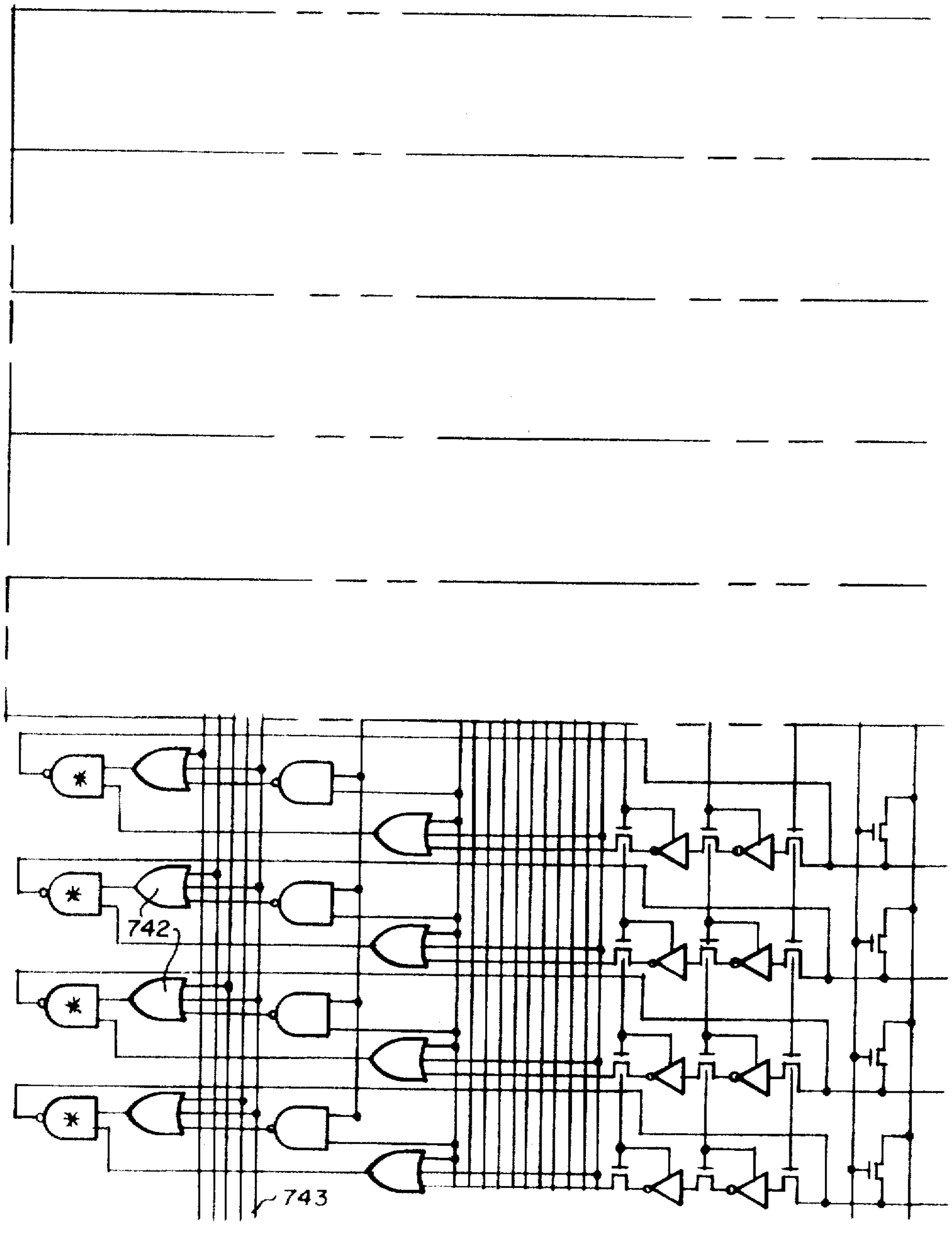
Figure 4M:
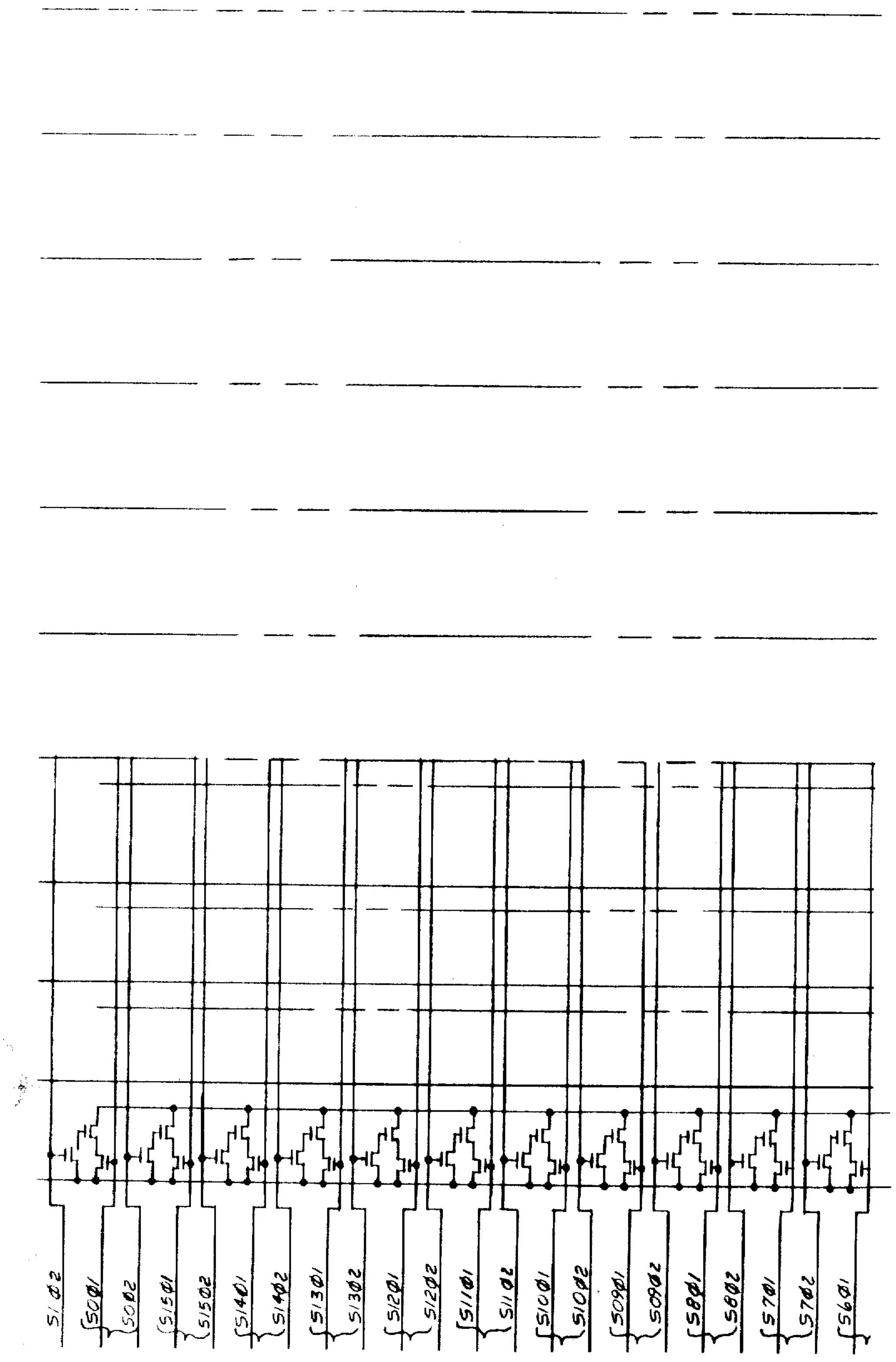
Figure 4N:
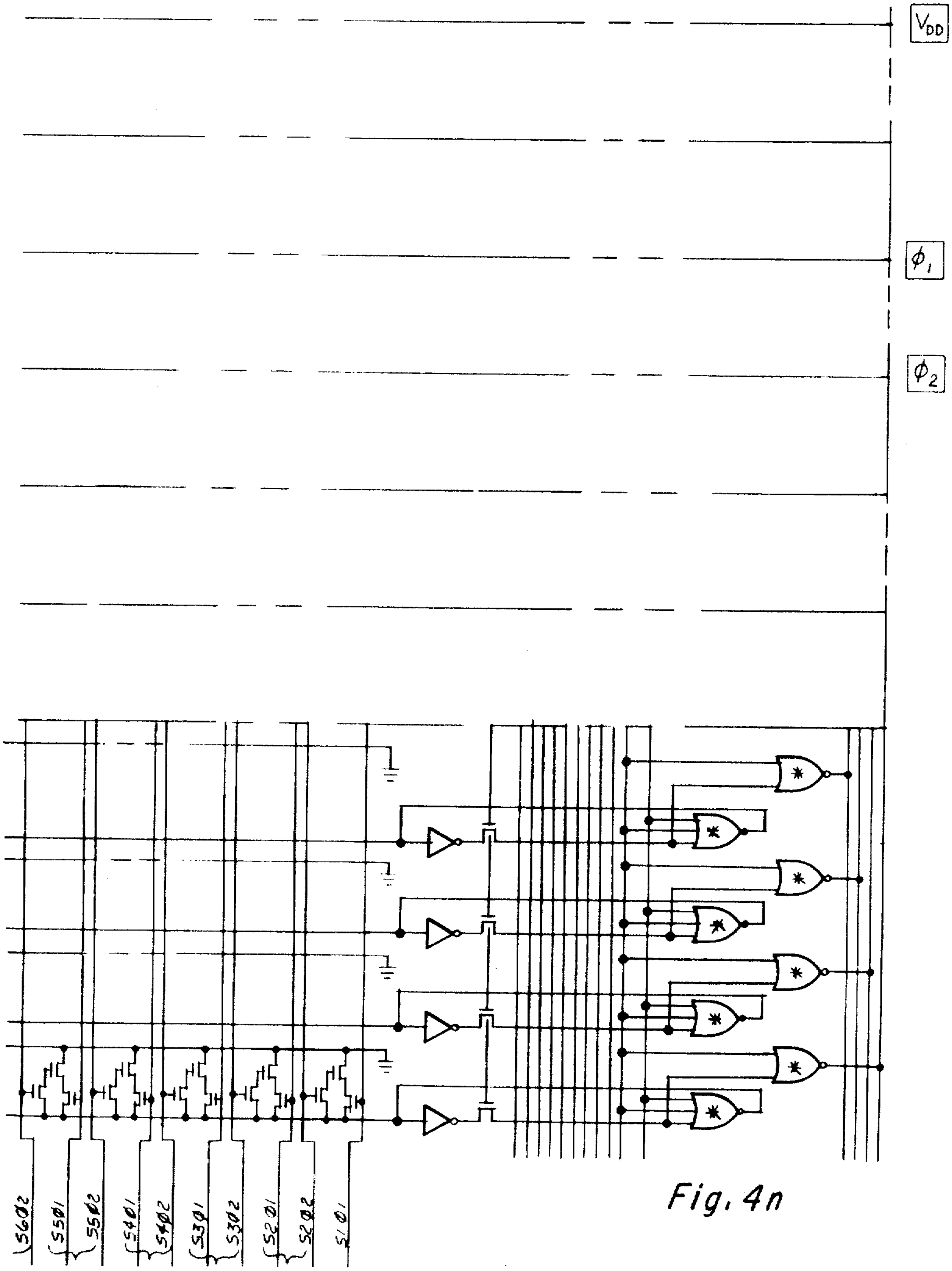
Figure 4O:
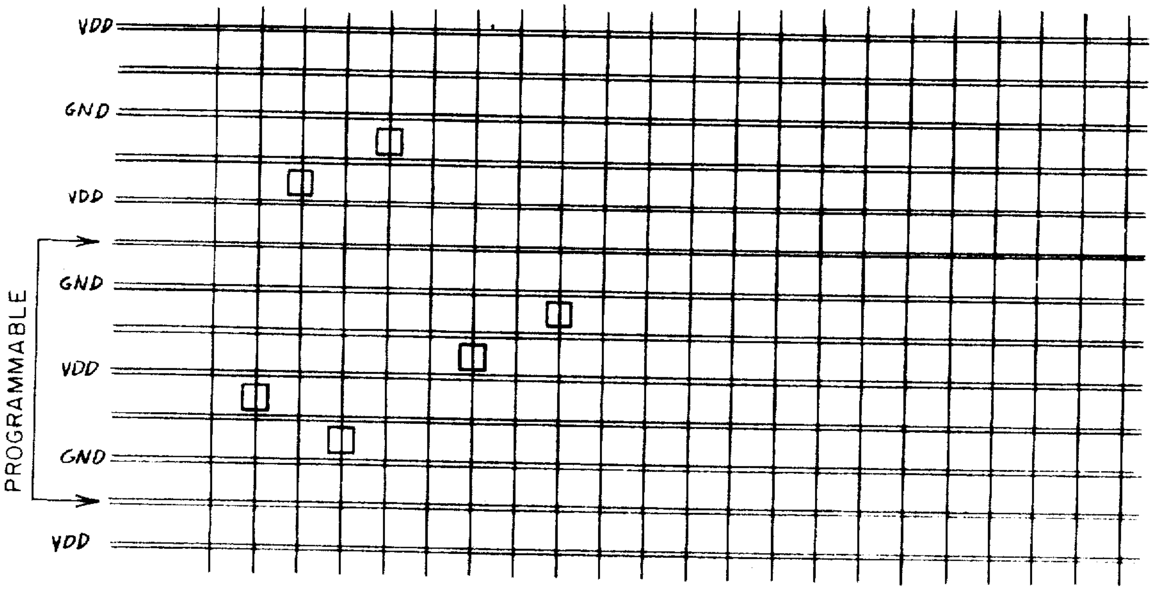
Figure 4P:
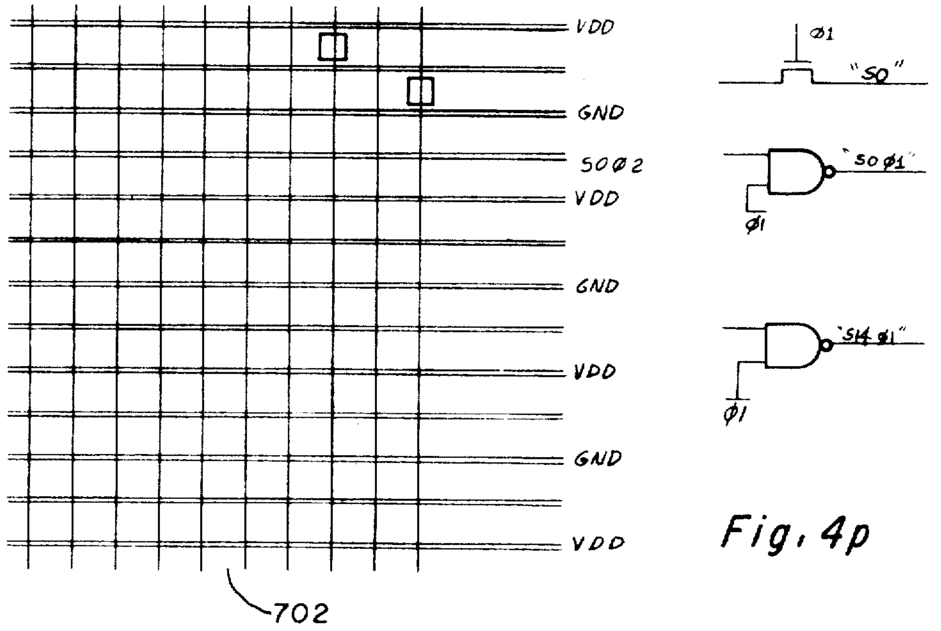

Referring now to FIG. 4, the circuitry of the 10-register chip will be described in detail. The memory 700 is made up of 40 rows of 16 cells per row, with each cell being a three transistor cell of the type described in detail in copending application Ser. No. 334,493, which is incorporated herein by reference. The input and output transistors are both connected to a common input/output line 726.

DATA INPUT AND OUTPUT CIRCUITRY

Data is received from the data chip and transmitted to the data chip via four I/O pins I/O1, I/O2, I/O4 and I/O8, seen in FIG. 2. The data is in the format of four BCD bits in parallel, 16 digits serially, one digit each state time. The input data is inverted and appears on lines 740 going into a gating arrangement 725 which either transmits the data directly through to input data lines 705 with no delay, or in the alternative delays one digit of the data at $S_{15}$ for an instruction cycle when $\overline{B}$ occurs for reasons to be explained later. In the selector gates 703, incoming data is applied to four gates 742 for each of the 10 registers in the memory 700. Each of these gates has a $\phi_2$ input from line 743 and another input from a set of 40 gates 744 which function to disable the new data input path during a right shift operation. For this reason, an $\overline{RSD}$ signal is applied at an input 745 to all of these gates, this $\overline{RSD}$ signal being derived in the right shift delay circuit 724. One and only one of the 10 registers in the memory 700 is selected for write in by one of 10 lines 710, which appear as inputs to gates 744 and to gates 746. The gates 746 also receive $\phi_2$ inputs from line 747 and recirculate inputs from delay circuits 748. Bits are read out of memory 700 on $\phi_1$; and delayed in the circuits 748 from this $\phi_1$, through $\phi_2$ (provided by line 749*a*) until $\phi_1$ of the next state time, at which time the bits are available at inputs to gates 746. Recirculate will always occur except when data is being written in to a specific register via lines 705 ang gates 742 (this includes clear) or data is being right shifted; for data in, recirculate for data in is killed in gates 746, as well as for right shift. Data is entered into the cells in memory 700 only on $\phi_2$, hence the $\phi_2$ inputs 743 and 747. Data entry from lines 705 is via gates 742 and gates 749, then via lines 750 to the input/output lines 726 in the memory. Recirculate is via delay circuits 748, gates 749 and lines 750.

On the output side, selector gates 704 include output gates 751 which are activated by output register select signals in lines 711 from decoder 709; the gates 751 receive inverted (false) data from memory input/output lines 726 via lines 752, clocked out on $\phi_1$ at line 753. The outputs of gates 751 are applied to output lines 706. Right shift is implemented by gates 753, which also receive inverted (false) data from lines 726 on $\phi_1$ along with register select signals from lines 711, and a right shift command from line 754. Since bits can be entered into the memory only at $\phi_2$, a gate 755 is responsive to a right shift command on line 756 and $\overline{\phi_2}$. Data to be reentered in right shifted position is fed back via lines 757; at this point the data has been delayed one-half state time, i.e., from $\phi_1$ to $\phi_2$, and inverted. True data is written into the memory and stored in true logic but is inverted on right shift to render true data available. Further detailed operation of the SAM cell is found in the above referenced application Ser. No. 334,493.

THE ADDRESS CIRCUITRY

The address logic circuit 712 receives address data from I/O pins via lines 705, and these digits of data are clocked in when an "REG to I/O" instruction has been given, under control of pulses on line 758. Address data is clocked into address logic 712 only on $S_0\phi_2$, $S_2\phi_2$ and $S_3\phi_2$ as seen. These three digits are stored in three stages of the address logic; in effect three shift register stages are provided.

The first shift register stage comprises four clocked inverter gates 759 in combination with the series gate and inverter 760 connection. At $S_0\phi_2$ data from lines 705 is communicated to inverters 759 and upon the subsequent $\phi_1$ clock, it is shifted to the output of inverters 760. Upon the next gating pulse from line 758 at time $S_2\phi_2$, the third data digit is entered into the first stage and the first data digit previously in the first stage is communicated to the second shift register stage comprising gated inverters 761 in combination with the serial $\phi_1$ gate and inverter 762 combination. Upon the succeeding $\phi_1$ clock, the first digit is stored at the output of inverters 762 and the third data digit is stored at the output of inverters 760. At time $S_3\phi_2$, the fourth data digit is impressed upon the input of the first shift register and shifted therein at the subsequent $\phi_1$, with the second digit shifted to the output of inverters 762 in the second stage and the first digit is shifted into the third stage impressed upon the inputs of gate 763 and gates 764.

Accordingly, at data chip internal state time $S_4\phi_1$ (the $\phi_1$ clock after $S_3\phi_2$) the address logic 712 is storing the first, third and fourth digits of the data word, $S_0$, $S_2$ and $S_3$, respectively. The first bit of the first digit is communicated through inverter 763 and line 723 as an input to the control logic 721. As earlier explained, a one in the first bit of the first digit is an "input" command and a zero in the first bit is an "output" command. "Input" and "output" signals are generated in response thereto for subsequent use as will be later explained.

The remaining three bits of the first digit at $S_0$ are communicated to the logic arrangement 764 wherein only the second and third bits, the "2" and "4" bits, are controlling. This is seen looking at the PLA 765 having circles interconnecting $V_{DD}$ and line 765 respectively to the leftmost two OR gates. These two bits in the $S_0$ digit define whether a specific chip is to be cleared, the "4" bit, or whether all chips in the expanded data system are to be cleared, the "2" bit. If zeros are present in either the two and four bits of the addressed chip, an output is generated on line 766 to the control circuitry of the input register select 708. Commands will there be communicated to all registers in the particular 10-register chip for inputing zeros or clearing the registers via lines 705, which includes actuating the output PLA 709 during right shift via lines 776 and 773.

The fourth digit at $S_3$ at the output of inverters 760 is communicated via lines 767 to the chip select logic 717. There, as earlier described, the encoded BCD digit is compared with the code externally impressed upon terminals AD1–AD8. Upon a match an output appears from logic arrangement 768 which is recommunicated to the address logic 712 via line 765 after being inverted so as to gate the $S_0$ digit, "2" and "4" bits, for clearing the match. Line 769 communicates the match to control logic 721 so as to generate the "input" and "output" signals in gates 770 and 771 in further response to the first bit of the first data digit.

The third digit of the data word at time $S_2$ being held in the address logic 712 at the output of inverters 762 is communicated to the input register select 708 via line 772 and to the output register select 709 via lines 773. Lines 773 are actuated on both "input" and "output," but only upon an "output" or right shift signal are they entered into output select control circuitry 782*a*. Gate 775 is a "clear all" decode indicating a binary "15" or illegal condition (as only 10 registers are in the chip) to the output PLA 709 indicating a "clear all" instruction.

When an input function has been commanded, the second digit is communicated via line 772 to the input register select 708 for indicating which register is to have the following data entered. Matrix 774 is a programmable logic array which decodes the particular BCD format of the second digit to uniquely enable the particular register via lines 710. Gates 800 selectively couple loads 802 to the matrix 774 in response to state time S1 such that matrix 774 is periodically actuated for decoding during state time S1 only, i.e., a 1/16 duty cycle.

Line 774*a* is responsive to the "clear all" output command on line 766 from the logic arrangement 764 in the address logic 712 to provide a BCD 15 or 1111 code to the gates 774*b*. Upon the "15" code, gate 775 via line 776 supplies a command to the output register select 709 for enabling right shifting of all 10-registers on the chip, as required during implementation of the "clear all" routine. The "clear" operation is actually accomplished by writing 0's into the SAM 700 cell and then right shifting the registers one bit. As described in the above referenced copending application Ser. No. 334,493, data is written into the SAM cell in false logic (or rather read out in false logic) and then is inverted upon right shift so that it is subsequently reread out in true logic. Accordingly, when all ones are written in for the clear function, and subsequently right shifted, zeros are provided in each SAM cell and the clear function has been accomplished. The "clear all right shift enable" on line 776 is allowed into the output register select 709 only upon actuation of gate 774 from a command RSD from the right shift delay circuit 724. As mentioned above, data inputed into the 10-register chip is automatically right shifted so as to avoid timing complications with bit $S_{15}$.

The control logic 721 is also actuated immediately after the "Reg to I/O" instruction from the data chip. If at time $S_{14}$ there has been a Flag A-command, coincident with a one on the CONB input signifying that the data chip is in a "not idle" mode so that the flags appearing at the Flag A-input are in time coincidence with the S times, the 10-register chip then knows that it is being addressed. Gate 775 in the control logic 721 is responsive to a "programmable flag" generated in the timing matrix 702 at time $S_{14}$. Timing matrix 702 is a push-pull matrix similar to matrices 280 and 310 in the data chip described in detail in Ser. No. 255,856, filed May 22, 1972, for "Electronic Calculator." The programmable flag generated by timing matrix 702 is generated at $S_{14}\phi_1$ by a temporary ground until $S_{15}\phi_1$ when it is coupled to $V_{DD}$ until the next subsequent $S_{14}$ time.

An edge detector circuit 776 is responsive to the Flag A, CONB, and programmable flag condition and gate 777 therein generates a $\overline{\text{reset}}$ signal $\overline{\text{reset}}$ in response to CONB, exclusive of Flag A and "programmable flag." $\overline{\text{Reset}}$ is coupled to the state counter 701 which drives the registers 700 coincident with S-times. $\overline{\text{Reset}}$ synchronizes the state counter during power up so that the S-times generated by the state counter 701 will be synchronized with the S-times on the data chip.

The edge detector 776 is responsive to the output of gate 778 at time $S_{14}$ indicating coincidence of the flags and CONB and causes a latch circuit 779 to be set, the output of which is coupled to gate 780 for generating the gating signal on line 758 for allowing the address word to be entered into the address logic 712.

The output of the latch 779 is further coupled to a delay arrangement 781A for providing the "output" and "input" signals earlier discussed. At $S_0\phi_1$ the output of latch 779 actuates gate 782B and at $S_{14}\phi_1$, 14 S-times later, the inverted output of gate 782B is coupled to gate 770 for providing the "input" signal, in combination with the output of inverter 763, indicative of the first bit of the first digit of the address word. At $S_{14}\phi_2$ the output of gate 782 actuates gate 771 in cooperation with line 723 to provide the "output" signal. The output signal is coupled into control circuitry 782 for the output register select 709. The "output" signal also is coupled to delay arrangement 783 gating the output buffers 707 which selectively communicate the contents of the particular register back to the data chip through I/O terminals 1–8.

As indicated above, the "input" signal generated at gate 770 is generated at time $S_{14}\phi_1$ during the third instruction set earlier described, at which time the data chip zeros the Flag A bit entering logic gate 778. The $\overline{\text{input}}$ signal generated at $S_0\phi_1$ at the inverted output of gate 781 is therefore coincident with the commencement of transmission of data from the data chip to be entered into the registers during the fourth instruction set. $\overline{\text{Input}}$ is coupled to gate 782 at $S_0\phi_2$ for enabling gates 783 to enter the second digit of the data word or the particular register select into the input register select 708. The matrix 774 is then actuated during a subsequent S1 time for decoding the register select signal. $\overline{\text{Input}}$ also actuates the right shift delay circuit 724 at time $S_{15}\phi_1$ when $\overline{\text{input}}$ is inverted and coupled to gate 783 for producing $\overline{\text{RS}}$ ($\overline{\text{right shift}}$). Gate 783 is also responsive to the timing matrix 702 providing a one at time $S_{13}\phi_2$ for one S-time which is inverted and gated into gate 783 via 784 at time $S_{14}\phi_1$. Therefore, $\overline{\text{right shift}}$ is generated at $S_{15}\phi_1$ when input is at $V_{DD}$ or at logic "0", indicating an "$\overline{\text{input}}$" function has been commanded. $\overline{\text{Right shift}}$ delay on line 745 is generated one S-time later at $S_0$. $\overline{\text{Right shift}}$ delay is coupled to gate 782 of the input register select 708 and is coupled to timing circuitry 785 for producing $\bar{B}$ and circuitry 786 for producing $\bar{A}$, respectively. $\overline{\text{Right shift}}$ delay is also coupled to the selector gate 703 as earlier described for killing the recirculate during right shift.

Also known in the right shift delay circuit 724 is delay arrangement 787 responsive to time $S_{14}$ from the timing matrix 702 for providing time $S_{15}\phi_1$ at the output of gate 788.

Thus, $\overline{\text{right shift}}$ delay is essentially delayed one instruction cycle from $\overline{\text{input}}$ at $S_0$ so as to actuate the input register select which is controlled by the address logic 712 so as to actuate only the particular selected register. After all the data bits 0–14 have been read into the particular register via lines 705, during the next instruction cycle bits 0–14 are right shifted leaving bit $S_{15}$ to be read into the now vacant cell from which $S_{14}$ was right shifted. The automatic right shift is provided in accordance with the right shift signal generated in the right shift delay circuit 724 (or rather the $\overline{\text{right shift}}$ signal is inverted and applied to control circuitry 782). That is, right shift is coupled at $S_0\phi_1$ to line 756 providing for automatic right shift.

Meanwhile, during the fourth instruction set wherein data bits 0–14 are entered into the particular register, signal $\bar{A}$ generated by circuit 786 from $\overline{\text{right shift}}$ delay allows entry of the data from the I/O pins 1–8 via lines 740 with zero delay. Logic arrangement 725 passes the $S_0$–$S_{14}$ digits so as to enter true data into the particular memory cells in the SAM registers in the 10-register chip. Then upon right shift, the data is read out and inverted, and stored as "false" data. $\overline{\text{Right shift}}$ delay actuates gate 789 so as to provide signal $\bar{A}$ which gates logic arrangement 725 allowing entry of the first 15 bits of data via lines 740 so that the first 15 bits are not delayed and are entered via lines 705 into the particular SAM cell. However, signal $\bar{A}$ changes to a logic 0 for the 16th or $S_{15}$ bit and signal $\bar{B}$ changes to a logic 1. When signal $\bar{A}$ changes to a logic 0, the logic arrangement 725 will only accept data via the OR gate input, and the $S_{15}{}^{th}$ bit is entered therethrough upon the next instruction cycle when $\bar{A}$ changes to a logic 1. This provides execution time for the automatic right shift, i.e., providing a cell for the $S_{15}{}^{th}$ data bit. At time $S_{15}$ of the subsequent instruction cycle, the 16th bit is entered, after being inverted into the last cell in the SAM register 700.

THE OUTPUT CIRCUITRY

When the first bit of the first digit of the control word is a zero indicating an output function, "output" signal is generated at gate 771 and is applied to the control circuitry 782A. The second digit of the data word is applied through gate 774 via lines 773 also to the control circuitry 782A for indicating to the output register select 709 the contents of which register is to be outputed. Right shift delay is applied to gate 774 so that the second data digit is gated into the output select PLA at time $S_0$. The right shift delay and "output" signal also is coupled to power saver circuit 790 which selectively provides output loads to the PLA 709 only when needed. These loads are actuated only during the output operation at $\phi_1$ or during the right shift function at $\phi_1$, as earlier described. Since data in the 10-register cells are being recirculated and not right shifted or outputed during most of the operation cycle, the output decoder need not continuously be activated or energized by $V_{DD}$ to thereby reduce power drain. The RS and "output" signals selectively couple the loads to the PLA by properly biasing the gate of the respective devices. RS and "output" further actuate gate 793 so as to insure that the selected line in the PLA 709 returns to a logic 1, i.e., recharged after being cycled. This feature is an important power saver and is readily applied to any decoder or PLA, as well as in the calculator system herein described. Basic operation and structure of PLA arrays is described in detail in U.S. Pat. No. 3,702,985, "MOS Transistor Integrated Matrix," patented Nov. 14, 1972.

Output register select 709 decodes the word on lines 773 and selectively addresses the appropriate register on line 711. After the contents of the register have been outputed as above described via line 706, the output data is gated into the output buffers 707. Gating arrangements 791 is a precharge device allowing the output lines 706 to be precharged during the $P_1$ phase of the timing cycle.

Output buffers 707 are actuated via the "output" signal applied to delay arrangement 783 which allows the output data to enter the tri-state output buffers. That is, the output buffers exhibit three states: a 1 state, a 0 state, and an unactuated or "don't care" state. The output word is communicated to the I/O 1–8 terminals via the buffers 792. As signals $\bar{A}$ and $\bar{B}$ are not actuated during the output instruction so that the output word is not allowed to be transmitted as an input through lines 740, only allowed to be recommunicated to the data chip.

It is thus apparent that this invention provides increased data register capacity to expandable calculator systems heretofore having limited data storage capacity. The particular 10-register chip of this invention provides such features as power savings by actuating the output PLA only during the appropriate output or RS cycle, addressing means timed so as to allow access and recall of the registers with no apparent time delay to the data chip, automatic right shifting of the data in the memory cells with a subsequent insertion of the last bit of the data word into the last memory cell so as to insure reliable operation free of timing problems.

Although a specific embodiment of this invention has been described herein, in conjunction with a specific 10-register chip in combination with an expandable two-chip calculator system, various modifications to the particular implementation depicted will be apparent to those skilled in the art without departing from the scope of the invention.

What is claimed is:

1. In a data processing system of the type having an instruction memory for storing and providing instruction words, an arithmetic logic unit and a control unit therefor for processing data in response to instruction words and system timing, data storage for storing data, and means for communicating the stored data to said arithmetic logic unit in response to instruction words, and further having decoder means coupled to the arithmetic logic unit, said decoder means having a plurality of input lines and a plurality of output lines disposed to form a matrix, said output lines coupled to a reference potential for establishing a first logic voltage level thereon, said decoder means further having a first plurality of switching means arrayed at the intersections of said matrix for switching the voltage level on selective output lines from said first logic level to a second logic voltage level in response to signals during a first period on said input lines, the improvement comprising a second switching means for periodically coupling said reference potential to said output lines in response to a gating signal, and means coordinated with said system timing for selectively generating said gating signal to said switching means, whereby the non-selection of said potential inhibits any output signals from said decoder so as to conserve system power.

2. The data processing system according to claim 1 wherein said second switching means is a gated load device.

3. The data processing system according to claim 1 wherein said second switching means comprises a load device and a transistor switching element serially connected to said load device.

4. The data processing system according to claim 3 and including keyboard input means for inputting data and function commands into said system, and display output means for displaying data from said data storage, wherein said instruction and data memories, said arithmetic logic unit, said control unit and said decoder means are implemented in at least one semiconductor, field-effect type integrated circuit chip to comprise a calculator system.

5. The data processing system according to claim 1 and including input gating means for selectively coupling said input signals to and holding input signals on said input lines in response to other system timing signals, said first period less than the period of said other system timing signals.

6. In a data processing system of the type having an instruction memory for storing and providing instruction words, an arithmetic logic unit and a control unit therefor for processing data in response to instruction words and system timing, data storage for storing data, and means for communicating the stored data to said arithmetic logic unit in response to instruction words, and further having decoder means coupled to the arithmetic logic unit, said decoder means having a plurality of input lines and a plurality of output lines disposed to form a matrix, said output lines coupled to a reference potential for establishing a first logic voltage level thereon, said decoder means further having a first plurality of switching means arrayed at the intersections of said matrix for switching the voltage level on selective output lines from said first logic level to a second logic voltage level in response to signals on said input lines, the method of operating said decoder means comprising the steps of:

a. generating input data on said input lines throughout a time period; and b. periodically decoupling said reference potential from all said output lines during portions of said time period.

7. The method according to claim 6 wherein said reference potential is serially connected to said output lines by a transistor switching means having conductive and non-conductive states, and said step of selectively decoupling comprises the step of rendering said transistor switching means periodically non-conductive.

* * * * *